(12) United States Patent
Fricke et al.

(10) Patent No.: US 9,206,281 B2
(45) Date of Patent: Dec. 8, 2015

(54) POROUS GELS BASED ON AROMATIC POLYUREA

(75) Inventors: Marc Fricke, Osnabrueck (DE); Volker Schaedler, Ann Arbor, MI (US)

(73) Assignee: BASF SE, Ludwigshafen (DE)

( * ) Notice: Subject to any disclaimer, the term of this patent is extended or adjusted under 35 U.S.C. 154(b) by 100 days.

(21) Appl. No.: 13/381,231

(22) PCT Filed: Jun. 24, 2010

(86) PCT No.: PCT/EP2010/058992
§ 371 (c)(1),
(2), (4) Date: Dec. 28, 2011

(87) PCT Pub. No.: WO2011/000771
PCT Pub. Date: Jan. 6, 2011

(65) Prior Publication Data
US 2012/0111228 A1    May 10, 2012

(30) Foreign Application Priority Data
Jun. 29, 2009 (EP) .................... 09164027

(51) Int. Cl.
| | |
|---|---|
| *C08G 18/32* | (2006.01) |
| *C08G 18/10* | (2006.01) |
| *C08G 18/12* | (2006.01) |
| *C08G 18/64* | (2006.01) |
| *C08G 18/65* | (2006.01) |
| *C08J 9/28* | (2006.01) |
| *C08G 101/00* | (2006.01) |

(52) U.S. Cl.
CPC ............ *C08G 18/3237* (2013.01); *C08G 18/10* (2013.01); *C08G 18/12* (2013.01); *C08G 18/3225* (2013.01); *C08G 18/3228* (2013.01); *C08G 18/3243* (2013.01); *C08G 18/6423* (2013.01); *C08G 18/6529* (2013.01); *C08J 9/286* (2013.01); *C08G 2101/0091* (2013.01); *C08G 2330/50* (2013.01); *C08J 2201/0502* (2013.01); *C08J 2375/02* (2013.01)

(58) Field of Classification Search
CPC ........... C08G 18/3225; C08G 18/6423; C08G 2101/0091; C08J 2101/0502; C08J 2375/02
USPC ..................... 521/61–64, 155, 163
See application file for complete search history.

(56) References Cited

U.S. PATENT DOCUMENTS

| | | | |
|---|---|---|---|
| RE29,711 E * | 7/1978 | Wood ............................ | 523/307 |
| 4,798,862 A * | 1/1989 | Gillis, Jr. ...................... | 524/783 |
| 5,478,867 A | 12/1995 | Tabor | |
| 2003/0220464 A1 * | 11/2003 | Wu et al. .......................... | 528/61 |
| 2007/0100112 A1 * | 5/2007 | Sarpeshkar et al. ............ | 528/44 |
| 2008/0064527 A1 * | 3/2008 | Wu et al. ........................ | 473/373 |
| 2010/0148109 A1 | 6/2010 | Schadler et al. | |
| 2012/0007012 A1 | 1/2012 | Fricke et al. | |
| 2012/0193286 A1 | 8/2012 | Prissok et al. | |

FOREIGN PATENT DOCUMENTS

| | | |
|---|---|---|
| WO | 95 02009 | 1/1995 |
| WO | 2008 138978 | 11/2008 |
| WO | WO-2008134359 A1 * | 11/2008 |
| WO | 2009 027310 | 3/2009 |

OTHER PUBLICATIONS

Machine translation of WO 2009/027310 obtained from the European Patent Office on Oct. 10, 2013.*
U.S. Appl. No. 13/403,530, filed Feb. 23, 2012, Fricke, et al.
U.S. Appl. No. 13/422,704, filed Mar. 16, 2012, Fricke, et al.
U.S. Appl. No. 13/432,820, filed Mar. 28, 2012, Fricke, et al.
International Search Report Issued Feb. 9, 2011 in PCT/EP10/058992 Filed Jun. 24, 2010.
U.S. Appl. No. 13/143,144, filed Jul. 1, 2011, Emge, et al.

* cited by examiner

*Primary Examiner* — Melissa Rioja
(74) *Attorney, Agent, or Firm* — Oblon, McClelland, Maier & Neustadt, L.L.P.

(57) ABSTRACT

The invention relates to a porous gel comprising the following components, in reacted form:
 (a1) at least one polyfunctional isocyanate,
 (a2) at least one polyfunctional aromatic amine and
 (a3) at least one polyalkylenepolyamine.
The invention further relates to a process for preparing porous gels, to the porous gels thus obtainable and to the use of the porous gels as an insulating material and in vacuum insulation panels.

22 Claims, No Drawings

POROUS GELS BASED ON AROMATIC POLYUREA

The invention relates to a porous gel comprising the following components, in reacted form:
(a1) at least one polyfunctional isocyanate,
(a2) at least one polyfunctional aromatic amine and
(a3) at least one polyalkylenepolyamine.

The invention further relates to a process for preparing porous gels, to the porous gels thus obtainable and to the use of the porous gels as an insulating material and in vacuum insulation panels.

Porous gels with pores in the size range of a few micrometers or significantly lower and a high porosity of at least 70% are particularly good thermal insulators on the basis of theoretical considerations.

Such porous gels with a small mean pore diameter may be present, for example, in the form of organic xerogels. In the literature, the term "xerogel" is not used uniformly throughout. In general, a xerogel is understood to mean a porous material which has been prepared by a sol-gel process, the liquid phase having been removed from the gel by drying below the critical temperature and below the critical pressure of the liquid phase ("subcritical conditions"). In contrast, reference is generally made to aerogels when the removal of the fluid phase from the gel has been performed under supercritical conditions.

In the sol-gel process, a sol is first prepared on the basis of a reactive organic gel precursor, and then the sol is gelated by a crosslinking reaction to form a gel. In order to obtain a porous material, for example a xerogel, from the gel, the liquid has to be removed. This step is referred to hereinafter in a simplifying manner as drying.

WO-95/02009 discloses isocyanate-based xerogels which are suitable especially for applications in the field of vacuum insulation. The publication additionally discloses a sol-gel-based process for preparing the xerogels using known polyisocyanates including aromatic polyisocyanates and an unreactive solvent. As further compounds with active hydrogen atoms, aliphatic or aromatic polyamines or polyols are used. The examples disclosed in the publication comprise those in which a polyisocyanate is reacted with diaminodiethyltoluene. The xerogels disclosed generally have mean pore sizes in the region of 50 µm. In one example, a mean pore diameter of 10 µm is specified.

WO2008/138978 discloses xerogels comprising from 30 to 90% by weight of at least one polyfunctional isocyanate and from 10 to 70% by weight of at least one polyfunctional aromatic amine, the volume-weighted mean pore diameter of which is at most 5 micrometers.

The material properties, especially the mechanical stability of the known porous gels based on polyurea, are, however, not adequate for all applications. In addition, the underlying formulations, in the course of drying under subcritical conditions, exhibit shrinkage with reduction of porosity and exhibit a low gelation rate.

It was therefore an object of the invention to provide a porous gel which has the abovementioned disadvantages only to a minor degree, if at all. Furthermore, the porous gels should have a low thermal conductivity even at pressures above the vacuum range, especially in a pressure range from about 1 mbar to about 100 mbar. This is desirable since a pressure increase occurs in vacuum panels in the course of time. More particularly, the porous gel should have a high porosity and a sufficiently high mechanical stability. Furthermore, the porous gels should have a low flammability and a high thermal stability.

A further object consisted in providing a process which makes available a porous gel with low pore size, high porosity and simultaneously high mechanical stability. In addition, the process for preparing the porous gels should provide porous gels with a low thermal conductivity and lead to low shrinkage when the solvent is removed under subcritical conditions.

Accordingly, the inventive porous gels and the process according to the invention for preparing porous gels have been found.

Preferred embodiments can be taken from the claims and the description. Combinations of preferred embodiments do not leave the scope of this invention.

Porous Gels

According to the invention, the porous gel comprises the following components in reacted form:
(a1) at least one polyfunctional isocyanate,
(a2) at least one polyfunctional aromatic amine and
(a3) at least one polyalkylenepolyamine.

In the context of the present invention, a porous gel is a material which is porous and is obtained by means of a sol-gel process. In the context of the present invention, the inventive porous gel is in the form of a xerogel or of an aerogel. In the context of the present invention, the inventive porous gel is preferably in the form of a xerogel.

In the context of the present invention, a xerogel is understood to mean a porous gel having a porosity of at least 70% by volume and a volume-weighted mean pore diameter of at most 50 micrometers, which has been prepared by a sol-gel method, the liquid phase having been removed from the gel by drying below the critical temperature and below the critical pressure of the liquid phase ("subcritical conditions").

In contrast, an aerogel is understood to mean a corresponding porous gel when the removal of the fluid phase from the gel has been performed under supercritical conditions.

In the course of removal of the fluid phase from the gel, capillary forces are in action, which influence the pore structure of the resulting porous gel. In the course of removal of the fluid phase from the gel under supercritical conditions, these capillary forces are very small. In the course of removal of the fluid phase from the gel under subcritical conditions, the capillary forces, depending on the stability and type of the gel and on the polarity of the solvent to be removed, cause shrinkage of the gel with alteration of the pore structure.

In a preferred embodiment, the inventive porous gel comprises from 30 to 90% by weight of component (a1) composed of at least one polyfunctional isocyanate, and from 9.99 to 66% by weight of component (a2) composed of at least one polyfunctional aromatic amine, and (a3) from 0.01 to 4% by weight of at least one polyalkylenepolyamine, where the sum of the percentages by weight of components (a1) to (a3), based on the total weight of components (a1), (a2) and (a3), adds up to 100% by weight.

Components (a1), (a2) and (a3) are present in reacted form in the porous gel. "Reacted form" is understood to mean a polymeric or polymer-bound form.

The porous gel preferably comprises from 38 to 80% by weight of component (a1) and from 19 to 58% by weight of component (a2), and from 1 to 4% by weight of component (a3), based on the total weight of components (a1), (a2) and (a3). The percentages by weight always reflect the amount of the components used, which are present in reacted form in the porous gel.

In the context of the present invention, functionality of a compound shall be understood to mean the number of reactive groups per molecule. In the case of component (a1), the functionality is the number of isocyanate groups per molecule. In the case of the amino groups of component (a2), the functionality is the number of reactive amino groups per molecule. A polyfunctional compound has a functionality of at least 2.

If components (a1) or (a2) used are mixtures of compounds with different functionality, the functionality of the components is calculated from the number-weighted mean of the functionality of the individual compounds. A polyfunctional compound comprises at least two of the abovementioned functional groups per molecule.

The mean pore diameter is determined by means of mercury intrusion measurement to DIN 66133 and is always a volume-weighted mean value in the context of the present invention. The mercury intrusion measurement to DIN 66133 is a porosimetry method and is performed in a porosimeter. In this method, mercury is pressed into a sample of the porous material. Small pores require a higher pressure to be filled with the mercury than large pores, and the corresponding pressure/volume diagram can be used to determine a pore size distribution and the volume-weighted mean pore diameter.

The volume-weighted mean pore diameter of the porous gel is preferably at most 5 micrometers. The volume-weighted mean pore diameter of the porous gel is more preferably at most 3.5 micrometers, most preferably at most 3 micrometers and especially at most 2.5 micrometers.

A minimum pore size with high porosity is desirable from the point of view of low thermal conductivity. However, for production reasons and in order to obtain a sufficiently mechanically stable porous gel, a practical lower limit in the volume-weighted mean pore diameter arises. In general, the volume-weighted mean pore diameter is at least 10 nm, preferably at least 50 nm. In many cases, the volume-weighted mean pore diameter is at least 100 nm, especially at least 200 nm.

The inventive porous gel preferably has a porosity of at least 70% by volume, especially from 70 to 99% by volume, more preferably at least 80% by volume, most preferably at least 85% by volume, especially from 85 to 95% by volume. The porosity in % by volume means that the reported proportion of the total volume of the porous gel consists of pores. Although a maximum porosity is usually desirable from the point of view of minimal thermal conductivity, the upper limit in the porosity arises through the mechanical properties and the processability of the porous gel.

According to the invention, components (a1) to (a3) are present in polymeric form in the porous gel. Owing to the inventive composition, components (a1) and (a2) are present in the porous gel bonded predominantly via urea linkages. A further possible linkage in the porous gel is that of isocyanurate linkages, which arise through trimerization of isocyanate groups of component (a1). When the porous gel comprises further components, further possible linkages are, for example, urethane groups which are formed by reaction of isocyanate groups with alcohols or phenols.

Components (a1) and (a2) are preferably present in the porous gel linked by urea groups —NH—CO—NH— to an extent of at least 50 mol %. Components (a1) and (a2) are preferably present in the porous gel from 50 to 100 mol % linked by urea groups, especially from 60 to 100 mol %, even more preferably from 70 to 100 mol %, especially from 80 to 100 mol %, for example from 90 to 100 mol %.

The molar % lacking from 100 mol % are present in the form of further linkages, especially as isocyanurate linkages. The further linkages may, however, also be present in the form of other linkages of isocyanate polymers known to those skilled in the art. Examples include ester, urea, biuret, allophanate, carbodiimide, isocyanurate, uretdione and/or urethane groups.

The molar % of the linkages of the monomer components in the porous gel are determined by means of NMR spectroscopy (nuclear spin resonance) in the solid or in the swollen state. Suitable determination methods are known to those skilled in the art.

The use ratio (equivalence ratio) of NCO groups of components (a1) to amino groups of component (a2) is preferably from 1.01:1 to 1.5:1. The equivalence ratio of NCO groups of component (a1) to amino groups of component (a2) is more preferably from 1.1:1 to 1.4:1, especially from 1.1:1 to 1.3:1. An excess of NCO groups leads to lower shrinkage of the porous gel when the solvent is removed.

Component (a1)

According to the invention, the porous gel comprises at least one polyfunctional isocyanate in reacted form. The porous gel preferably comprises from 30 to 90% by weight, more preferably from 38 to 80% by weight, especially from 40 to 70% by weight, of at least one polyfunctional isocyanate in reacted form, based on the total weight of components (a1), (a2) and (a3). Useful polyfunctional isocyanates include aromatic, aliphatic, cycloaliphatic and/or araliphatic isocyanates. Such polyfunctional isocyanates are known per se or can be prepared by methods known per se. The polyfunctional isocyanates can especially also be used in the form of mixtures, such that component (a1) in this case comprises different polyfunctional isocyanates. Polyfunctional isocyanates useful as a constituent of component (a1) have two (referred to hereinafter as diisocyanates) or more than two isocyanate groups per molecule of the component.

Especially suitable are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), dimethyldiphenyl 3,3'-diisocyanate, diphenylethane 1,2-diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methylcyclohexane 2,4- and/or 2,6-diisocyanate and/or dicyclohexylmethane 4,4'-, 2,4'- and 2,2'-diisocyanate.

Preferred polyfunctional isocyanates of component (a1) are aromatic isocyanates. Particularly preferred polyfunctional isocyanates of component (a1) have the following embodiments:

i) polyfunctional isocyanates based on tolylene diisocyanate (TDI), especially 2,4-TDI or 2,6-TDI or mixtures of 2,4- and 2,6-TDI;

ii) polyfunctional isocyanates based on diphenylmethane diisocyanate (MDI), especially 2,2'-MDI or 2,4'-MDI or 4,4'-MDI or oligomeric MDI, which is also referred to as polyphenylpolymethylene isocyanate, or mixtures of two or three of the aforementioned diphenylmethane diisocyanates, or crude MDI which is obtained in the preparation of MDI, or mixtures of at least one oligomer of MDI and at least one of the aforementioned low molecular weight MDI derivatives;

iii) mixtures of at least one aromatic isocyanate according to embodiment i) and at least one aromatic isocyanate according to embodiment ii).

As a polyfunctional isocyanate, particular preference is given to oligomeric diphenylmethane diisocyanate. Oligomeric diphenylmethane diisocyanate (referred to hereinafter as oligomeric MDI) is one oligomeric condensation product or a mixture of a plurality of oligomeric condensation products and hence derivatives of diphenylmethane diisocyanate (MDI). The polyfunctional isocyanates may preferably also be formed from mixtures of monomeric aromatic diisocyanates and oligomeric MDI.

Oligomeric MDI comprises one or more polycyclic condensation products of MDI having a functionality of more than 2, especially 3 or 4 or 5. Oligomeric MDI is known and is frequently referred to as polyphenylpolymethylene isocyanate. Oligomeric MDI is typically formed from a mixture of MDI-based isocyanates with different functionality. Typically, oligomeric MDI is used in a mixture with monomeric MDI.

The (mean) functionality of an isocyanate which comprises oligomeric MDI may vary in the range from about 2.3 to about 5, especially from 2.5 to 3.5, especially from 2.5 to 3. Such a mixture of MDI-based polyfunctional isocyanates with different functionalities is especially crude MDI, which is obtained in the preparation of MDI.

Polyfunctional isocyanates or mixtures of a plurality of polyfunctional isocyanates based on MDI are known and are sold, for example, by Elastogran GmbH under the name Lupranat®.

The functionality of component (a1) is preferably at least two, especially at least 2.2 and more preferably at least 2.5. The functionality of component (a1) is preferably from 2.5 to 4 and more preferably from 2.5 to 3.

The content of isocyanate groups in component (a1) is preferably from 5 to 10 mmol/g, especially from 6 to 9 mmol/g, more preferably from 7 to 8.5 mmol/g. It is known to those skilled in the art that the content of isocyanate groups in mmol/g and the so-called equivalence weight in g/equivalent are in a reciprocal ratio. The content of isocyanate groups in mmol/g is calculated from the content in % by weight to ASTM D-5155-96 A.

In a preferred embodiment, component (a1) consists of at least one polyfunctional isocyanate selected from diphenylmethane 4,4'-diisocyanate, diphenylmethane 2,4'-diisocyanate, diphenylmethane 2,2'-diisocyanate and oligomeric diphenylmethane diisocyanate.

In this preferred embodiment, component (a1) more preferably comprises oligomeric diphenylmethane diisocyanate and has a functionality of at least 2.5.

Component (a2)

According to the invention, the porous gel comprises at least one polyfunctional aromatic amine in reacted form. The porous gel preferably comprises from 9.99 to 65% by weight, more preferably from 19 to 58% by weight, especially from 29 to 57% by weight, of at least one polyfunctional aromatic amine in reacted form, based on the total weight of components (a1), (a2) and (a3).

Suitable aromatic amines (a2) are especially isomers and derivatives of diamino-diphenylmethane. Isomers and derivatives of diaminodiphenylmethane preferred in the context of component (a2) are especially 4,4'-diaminodiphenylmethane, 2,4'-diamino-diphenylmethane, 2,2'-diaminodiphenylmethane and oligomeric diaminodiphenylmethane.

Suitable aromatic amines (a2) are also especially isomers and derivatives of tolueneamine. Isomers and derivatives of tolueneamine preferred in the context of component (a2) are especially toluenediamine, especially toluene-2,4-diamine and/or toluene-2,6-diamine and diethyltoluenediamine, especially 3,5-diethyl-toluene-2,4-diamine and/or 3,5-diethyl-toluene-2,6-diamine.

Component (a2) preferably comprises at least one polyfunctional aromatic amine, at least one of which is selected from isomers and derivatives of diaminodiphenylmethane, especially those mentioned above.

Component (a2) more preferably comprises at least one polyfunctional aromatic amine, at least one of which is selected from 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more polycyclic methylene-bridged condensation products of aniline and formaldehyde. Oligomeric MDA comprises at least one oligomer of MDA, but generally a plurality of oligomers of MDA, having a functionality of more than 2, especially 3 or 4 or 5. Oligomeric MDA is known or can be prepared by methods known per se. Typically, oligomeric MDA is used in the form of mixtures with monomeric MDA.

The (mean) functionality of a polyfunctional amine which comprises oligomeric MDA can vary in the range from about 2.3 to about 5, especially from 2.5 to 3.5 and especially from 2.5 to 3. Such a mixture of MDA-based polyfunctional amines with different functionalities is especially crude MDA which is formed especially in the condensation of aniline with formaldehyde, typically catalyzed by hydrochloric acid, as an intermediate of the preparation of crude MDI. Component (a2) preferably comprises oligomeric diaminodiphenylmethane and has a functionality of at least 2.3.

Component (a3)

According to the invention, the porous gel comprises at least one polyalkylenepoly-amine in reacted form as component (a3).

The inventive porous gels preferably comprise from 0.1 to 5% by weight of component (a3), based on the total weight of components (a1), (a2) and (a3), more preferably from 1 to 4% by weight, especially from 1 to 3% by weight.

A relatively high proportion of component (a3) has an advantageous effect with regard to the pore structure and especially with regard to mechanical properties and heat insulation capacity.

However, an increase in the proportion of component (a3), owing to its high reactivity, leads to a potential deterioration in the homogeneity of the material structure and properties. Before homogenous mixing is possible, cured regions may form in the material, which leads to a deterioration in the properties.

Against this background, it has been found to be advantageous to use component (a3) in an amount of at least 0.1% by weight, preferably at least 1% by weight, especially at least 2% by weight, based in each case on the total weight of components (a1) to (a3). It has also been found to be advantageous to use component (a3) in an amount of at most 5% by weight, especially at most 4% by weight, more preferably at most 3% by weight, based in each case on the total weight of components (a1) to (a3).

In the context of the present invention, the term "polyalkylenepolyamine" shall be understood to mean aliphatic amines which comprise at least 3 reactive amino groups, i.e. primary or secondary amino groups, and which have a weight-average molecular weight (Mw) of at least 500 g/mol.

The molecular weight of the useful polyalkylenepolyamines may vary within a wide range, especially from 500 g/mol to 3,000,000 g/mol. The polyalkylenepolyamines preferred as component (a3) preferably have a weight-average molecular weight (Mw) of 500 g/mol to 750,000 g/mol, preferably of 800 g/mol to 500,000 g/mol, more preferably of 1000 g/mol to 400,000 g/mol.

Particularly preferred polyalkylenepolyamines are especially polyethyleneimines. In the context of the present invention, polyethyleneimines are understood to mean both oligomers and homo- and copolymers which have the —CH2—

CH2—NH— moiety and comprise at least 3 amino groups, and have a weight-average molecular weight (Mw) of at least 500 g/mol.

The polyethyleneimines which are particularly preferred as component (a3) are preferably formed from units which are selected from terminal ethyleneimine units of the —(CH$_2$—CH$_2$—NH$_2$) structure, linear ethyleneimine units of the —(CH$_2$—CH$_2$—NH)— structure and branched ethyleneimine units of the N—(CH$_2$CH$_2$—)$_3$ structure.

Component (a3) most preferably consists of at least one polyethyleneimine. The molecular weight of the useful polyethyleneimines may vary within a wide range, especially from 500 g/mol to 3,000,000 g/mol. The polyethyleneimines which are particularly preferred as component (a3) preferably have a weight-average molecular weight (Mw) of 500 g/mol to 750,000 g/mol, preferably of 800 g/mol to 500,000 g/mol, more preferably of 800 g/mol to 50,000 g/mol, especially of 1000 g/mol to 25,000 g/mol.

In the context of the present invention, the weight-average molecular weight of polyalkylenepolyamines is determined by means of static light scattering, to which all molecular weights of the polyalkylenepolyamines and polyethyleneimines cited in the context of the invention apply. This involves first determining the refractive index increment do/dc by differential refractometry. Measurement by static light scattering is effected in a thermodynamically good solvent. The person skilled in the art additionally selects the concentration of the polyalkylenepolyamine in the solvent such that a dilute solution is present. The molecular weight is evaluated by a Zimm plot.

The use of polyethyleneimines with a high molecular weight or a high viscosity leads generally to porous gels with particularly good properties, especially with regard to porosity, thermal conductivity and strength. The use of polyethyleneimines with a low molecular weight or with a low viscosity leads generally to particularly simple performance of the preparation process with sufficiently good properties, especially with regard to porosity, thermal conductivity and strength.

The viscosity of the polyethyleneimines is generally within the range from 100 to 300,000 mPa·s, preferably within the range from 500 to 250,000 mPa·s, especially from 1000 to 200,000 mPa·s, determined to DIN EN ISO 2555 (Brookfield RVT viscosimeter, 20° C., 20 rpm).

Polyethyleneimines are obtainable, for example, by the processes in Ullmann Electronic Release under "Aziridines", or according to WO-A 94/12560.

The ethyleneimine homopolymers and oligomers based on ethyleneimine are generally obtainable by polymerizing ethyleneimine (aziridine) in aqueous or organic solution in the presence of acid-eliminating compounds, acids or Lewis acids. Such homopolymers are linear or preferably branched polymers. The latter generally have primary, secondary and tertiary amino groups in a ratio of, for example, about 1:1:0.7. The distribution of the amino groups is determined by means of $^{13}$C NMR spectroscopy.

When the polyethyleneimines used are copolymers, preference is given to comonomers which have at least two amino functions. Examples of suitable comonomers include alkylenediamines having 2 to 10 carbon atoms in the alkylene radical, preference being given to ethylenediamine and propylenediamine. Further suitable comonomers are diethylenetriamine, triethylenetetramine, tetraethylenepentamine, dipropylenetriamine, tripropylenetetramine, dihexamethylenetriamine, aminopropylethylenediamine and bisaminopropylethylenediamine.

However, the polyethyleneimines used are preferably those which are formed essentially from ethyleneimine, especially homopolymers of ethyleneimine.

The polyalkylenepolyamines are preferably used in anhydrous form, "anhydrous" meaning that the water content is from 0 to 1.5% by weight to DIN 53715 according to Karl Fischer, preferably from 0 to 1% by weight, more preferably from 0 to 0.5% by weight. Water in greater amounts often leads to foaming and to a deterioration in the pore structure.

However, it is possible in principle to use concentrated aqueous solutions of the polyalkylenepolyamines, which has a processing advantage especially when those with a very high molecular weight are used.

In a particularly preferred embodiment, the polyethyleneimines are highly branched. In the context of this invention, highly branched polyethyleneimines are understood to mean uncrosslinked macromolecules with —NH— groups, which are inhomogeneous with regard to their structure, especially with regard to the length and sequence of the sections between branching points. They may be formed analogously to dendrimers proceeding from a central molecule, but with different chain length of the branches. They may alternatively have a linear structure with functional side groups, or else, as a combination of the two extremes, have linear and branched molecular moieties.

The degree of branching (DB) is defined as DB=(T+Z)/(T+Z+L) where T is the number of terminal monomer units, Z is the number of branched monomer units and L is the number of linear monomer units, and is typically reported in percent. These numbers are determined by means of $^{13}$C nuclear resonance spectra as primary (gives T), tertiary (gives Z) and secondary (gives L) amino groups. For a definition of the degree of branching, see also H. Frey et al., Acta Polym. 1997, 48, 30.

The degree of branching DB of the particularly preferred highly branched polyethyleneimines is from 40 to 100%, preferably from 50 to 80% and especially from 55 to 70%.

Suitable polyethyleneimines are commercially available, for instance as Lupasol® from BASF.

Process for Preparing Porous Gels

The process according to the invention comprises the following steps:

(a) providing component (a1) and, separately therefrom, components (a2) and (a3), each in a solvent (C);

(b) converting components (a1) to (a3) in the presence of the solvent (C) to a gel;

(c) drying the gel obtained in the previous step, preferably by converting the liquid present in the gel to the gaseous state at a temperature and a pressure below the critical temperature and the critical pressure of the liquid present in the gel.

In a preferred embodiment, component (a1) is provided in a first vessel, and components (a2) and (a3) in a second vessel, each in a solvent (C), and finally combined at the start of step (b). The process according to the invention accordingly preferably comprises the following steps:

(a-1) providing component (a1) and, separately therefrom, components (a2) and (a3), each in a solvent (C), components (a2) and (a3) preferably being mixed beforehand;

(a-2) providing a gel precursor (A) comprising components (a1) to (a3) in a solvent (C) by combining the components provided in step (a-1);

(b) converting the gel precursor (A) in the presence of the solvent (C) to a gel;

(c) drying the gel obtained in the previous step, preferably by converting the liquid present in the gel to the gaseous state at a temperature and a pressure below the critical temperature and the critical pressure of the liquid present in the gel.

Step (a)

According to the invention, in step (a), component (a1) is provided separately from components (a2) and (a3), each in a solvent (C). The gel precursor (A) is obtained by the mixing of components (a1) to (a3). The gel precursor (A) thus comprises the components (a1) to (a3) described above under "porous gel" in the proportions likewise described above.

Components (a1) and (a2) are present in the gel precursor (A) in monomeric form or have been converted beforehand by partial or nonequimolar reaction of isocyanate and amino groups to a prepolymer which forms the gel precursor (A), optionally with further components (a1) to (a3). The gel precursor (A) is thus gelatable, i.e. it can be converted to a gel by crosslinking. The proportions of components (a1) to (a3) in the porous gel, in which they are present in polymeric form, correspond to the proportions of components (a1) to (a3) in the gel precursor (A) in which they are present in as yet unconverted form.

The viscosity of component (a1) used may vary within a wide range. Component (a1) used in step (a) of the process according to the invention preferably has a viscosity from 100 to 3000 mPa·s, more preferably from 200 to 2500 mPa·s.

The term "gel precursor (A)" indicates the gelatable mixture of components (a1) to (a3). The gel precursor (A) is subsequently converted in step (b), in the presence of the solvent (C), to a gel, a crosslinked polymer.

In step (a) of the process according to the invention, a mixture comprising the gel precursor (A) in a liquid diluent is thus provided. In the context of the present invention, the term "solvent (C)" comprises liquid diluents, i.e. both solvents in the narrower sense and dispersants. The mixture may especially be a true solution, a colloidal solution or a dispersion, for example an emulsion or suspension. The mixture is preferably a true solution. The solvent (C) is a compound which is liquid under the conditions of step (a), preferably an organic solvent.

It is known to those skilled in the art that aromatic amines, especially diamines, are formed when aromatic isocyanates, especially diisocyanates, are reacted with water. Accordingly, it is possible, instead of polyfunctional aromatic amines, to use corresponding aromatic polyfunctional isocyanates and an equivalent amount of water as component (a2), such that the desired amount of polyfunctional aromatic amine is formed in situ or in a preliminary reaction. In the case of an excess of component (a1) and simultaneous addition of water, component (a1) can be converted in situ partly to component (a2), which then reacts immediately with the remaining component (a1) to form urea linkages.

However, the polyfunctional amine is preferably not obtained from component (a2) in the presence of component (a1) in the solvent (C), but rather is added separately as component (a2). Accordingly, the mixture provided in step (a) preferably does not comprise any water.

Useful solvents (C) include in principle one compound or a mixture of a plurality of compounds, the solvent (C) being liquid under the pressure and temperature conditions under which the mixture is provided in step (a) (dissolution conditions for short). The composition of the solvent (C) is selected such that it is capable of dissolving or dispersing the organic gel precursor, preferably of dissolving it. Preferred solvents (C) are those which are a solvent for the organic gel precursor (A), i.e. those which dissolve the organic gel precursor (A) completely under reaction conditions.

The reaction product from step (b) is a gel, i.e. a viscoelastic chemical network which is swollen by the solvent (C). A solvent (C) which is a good swelling agent for the network formed in step (b) generally leads to a network with fine pores and small mean pore diameter, whereas a solvent (C) which is a poor swelling agent for the gel resulting from step (b) leads generally to a coarse-pore network with large mean pore diameter.

The selection of the solvent (C) thus influences the desired pore size distribution and the desired porosity. The solvent (C) is generally additionally selected such that precipitation or flocculation as a result of formation of a precipitated reaction product very substantially does not occur during or after step (b) of the process according to the invention.

In the case of selection of a suitable solvent (C), the proportion of precipitated reaction product is typically less than 1% by weight based on the total weight of the mixture. The amount of precipitated product formed in a particular solvent (C) can be determined gravimetrically by filtering the reaction mixture through a suitable filter before the gel point.

Useful solvents (C) include the solvents known from the prior art for isocyanate-based polymers. Preferred solvents are those which are a solvent for all components, (a1) to (a3), i.e. those which dissolve components (a1) to (a3) substantially completely under reaction conditions, such that the content of the organic gel precursor (A) in the overall mixture provided in step (a) including the solvent (C) is preferably at least 5% by weight. The solvent (C) is preferably inert, i.e. unreactive, toward component (a1).

Useful solvents (C) include, for example, ketones, aldehydes, alkyl alkanoates, amides such as formamide and N-methylpyrrolidone, sulfoxides such as dimethyl sulfoxide, aliphatic and cycloaliphatic halogenated hydrocarbons, halogenated aromatic compounds and fluorinated ethers. Likewise useful are mixtures of two or more of the aforementioned compounds.

Additionally useful as solvents (C) are acetals, especially diethoxymethane, dimethoxymethane and 1,3-dioxolane.

Dialkyl ethers and cyclic ethers are likewise suitable as solvents (C). Preferred dialkyl ethers are especially those having from 2 to 6 carbon atoms, especially methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are especially tetrahydrofuran, dioxane and tetrahydropyran.

Ketones and aldehydes having alkyl groups having up to 3 carbon atoms per substituent are likewise preferred as solvents (C).

In many cases, particularly suitable solvents (C) arise by using two or more compounds which are completely miscible with one another and are selected from the aforementioned solvents in the form of a mixture.

According to the invention, in step (a), components (a1) on the one hand, and (a2) and (a3) on the other hand, are provided in separate form.

The primary amino groups of component (a3) are preferably present in protected form at the start of step (b). More preferably, the primary amino groups of component (a3) are present in protective form before performance of step (b). Most preferably, component (a3) is provided in step (a), wherein the primary amino groups are present in protected form, especially by dissolution in a medium for protecting primary amino groups, which is simultaneously the solvent (C).

"Primary amino groups present in protected form" is understood to mean that the primary amino groups are essentially not present in free form as $-NH_2$. The primary amino groups of component (a3) which are present in protected form have a reduced reactivity toward isocyanates. The primary amino groups are preferably present in protected form by virtue of reversible connection to at least one further functional group or to at least one further molecule (so-called protecting groups).

"Reversible connection" is understood to mean that the corresponding functional groups or molecules (protecting groups) do reduce the reactivity of the primary amino groups toward isocyanates, but do not completely suppress the reaction, by either being eliminated in a controlled manner before the reaction of primary amino groups with isocyanate groups or—which is preferred—reforming reactive primary amino groups in the course of step (b) of the process according to the invention, which leads to a reduced reaction rate between primary amino groups and isocyanate groups. Such a reformation can proceed, for example, in the form of an equilibrium between protected form and reactive free form.

More preferably, the primary amino groups of component (a3) are present in step (b) in the form of a ketimine and/or of an aldimine. Very particular preference is given to the provision of component (a3) in step (a) of the process according to the invention in the form of a ketimine and/or aldimine.

This is understood to mean that at least some, preferably all, of the primary amino groups of component (a3) are present in the form of a ketimine and/or aldimine group. The ketimine and/or aldimine can be obtained especially by using a ketone and/or aldehyde as the solvent (C).

Suitable aldimines or ketimines derive from diamines or polyfunctional amines with primary amino groups and aldehydes or ketones, and can be obtained from these substances in a manner known per se, for example by heating in an inert organic solvent, optionally with removal of the water which forms, and optionally with catalysis, for example by means of an acid, but preferably by reaction in an excess of ketone and/or aldehyde as the solvent. The aldimines or ketimines may additionally also comprise further functional groups which are reactive toward isocyanate, for example hydroxyl or imino groups.

Additionally useful are ketimines or aldimines which, apart from protected primary amino groups, also comprise free secondary amino groups, for example the diketimine of diethylenetriamine with methyl isobutyl ketone.

When the protecting group is detached before or during the performance of step (b) by adding a detaching agent, the protecting group in the case of the aldimines and ketimines can be detached especially by adding water as the detaching agent.

However, the aldimines and/or ketimines are preferably reacted without preceding addition of a detaching agent in a slowed reaction with isocyanates in step (b) of the process according to the invention. In this case, an equilibrium between free and protected primary amino groups in the solvent (C) is preferably exploited.

The reaction products between polyfunctional aldimines and/or ketimines and polyisocyanates are in principle chemically identical or substantially identical to those of a direct reaction of amino groups and isocyanate groups. However, the reduction in the reaction rate of primary aliphatic amino groups and isocyanate groups has a positive influence especially on the pore structure of the gel which results in step (b).

The protecting groups which react reversibly with primary amines are preferably liquid under the experimental conditions. The protecting groups are preferably used in the form of a solvent (C) which is reactive toward primary amino groups.

Most preferably, in step (a), component (a3) is provided together with component (a2) dissolved in a ketone and/or aldehyde as the solvent (C), and combined with component (a1) in step (b).

Aldehydes or ketones which may be used to prepare the aldimines or ketimines are especially those corresponding to the general formula $R^2$—(CO)—$R^1$, where $R^1$ and $R^2$ are each hydrogen or alkyl groups having 1, 2, 3 or 4 carbon atoms. Suitable aldehydes or ketones are especially acetaldehyde, propionaldehyde, n-butyraldehyde, isobutyraldehyde, 2-ethylbutyraldehyde, valeraldehyde, isopentaldehyde, 2-methyl-pentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanacetaldehyde, ethyl glyoxylate, benzaldehyde, acetone, methyl isobutyl ketone, diethyl ketone, methyl ethyl ketone, methyl n-butyl ketone, ethyl isopropyl ketone, 2-acetylfuran, 2-methoxy-4-methylpentan-2-one, cyclohexanone and acetophenone. The aforementioned aldehydes and ketones may also be used in the form of mixtures.

In principle, it is possible to prepare an aldimine or ketimine beforehand in pure form and subsequently to provide it as a solution in a solvent (C). Preferably, the aforementioned aldehydes and/or ketones are, however, used as solvents (C) in the process according to the invention, in which case the aldimine or ketimine is formed when component (a2) is dissolved.

It is desirable that the aldehyde or the ketone possesses a boiling point below about 180° C., such that it can escape easily from the polymer during the setting stage.

Preferably, components (a1) on the one hand, and components (a2) and (a3) on the other hand, are dissolved separately from one another in a solvent (C), especially an aldehyde and/or ketone.

Suitable solvents (C) are especially those aldehydes and/or ketones in which the components (a1) to (a3) have sufficient solubility and in which reaction with the primary amino groups of component (a2) forms an aldimine and/or ketimine, preferably at room temperature.

In principle, the components (a1), (a2) and (a3) can be dissolved in different solvents (c1) and (c2), provided that the solvents are completely miscible with one another, and components (a1) to (a3) each have sufficient solubility in the solvent mixture.

In order to obtain, in step (b), a sufficiently stable gel which does not shrink greatly in the course of drying in step (c), the proportion of the gel precursor (A) in the overall mixture provided in step (a) of the process according to the invention generally must not be less than 5% by weight. The proportion of the gel precursor (A) in the overall mixture provided in step (a) of the process according to the invention including the solvent (C) is preferably at least 8% by weight, more preferably at least 10% by weight, especially at least 12% by weight.

On the other hand, the concentration of the components in the mixture provided must not be selected at too high a level, since a porous gel with favorable properties is otherwise not obtained. In general, the proportion of the gel precursor (A) in the overall mixture provided in step (a) of the process according to the invention is at most 40% by weight. The proportion of the gel precursor (A) in the overall mixture provided in step (a) of the process according to the invention including the solvent (C) is preferably at most 30% by weight, more preferably at most 20% by weight, especially at most 15% by weight.

Optionally, the mixture provided in step (a) comprises, as a further component (B), also at least one catalyst (b1). However, preference is given to performing the conversion of the gel precursor (A) without the presence of a catalyst.

When a catalyst (b1) is used, typically trimerization catalysts which catalyze the formation of isocyanurates are used. Such trimerization catalysts used may, for example, be catalysts widely known to those skilled in the art, for example those listed below.

When trimerization catalysts are used as component (b1), known catalysts such as quaternary ammonium hydroxides, alkali metal and alkaline earth metal hydroxides, alkali metal and alkaline earth metal alkoxides, and alkali metal and alkaline earth metal carboxylates, e.g. potassium acetate and potassium 2-ethylhexanoate, particular tertiary amines and nonbasic metal carboxylates, e.g. lead octoate and triazine derivatives, especially symmetrical triazine derivatives, are suitable. Triazine derivatives are particularly suitable as trimerization catalysts.

Components (a1) to (a3) are preferably used such that the gel precursor (A) comprises from 30 to 90% by weight of component (a1), from 9.99 to 65% by weight of component (a2) and from 0.01 to 5% by weight of component (a3).

The gel precursor (A) preferably comprises from 38 to 80% by weight of component (a1), from 19 to 58% by weight of component (a2) and from 1 to 4% by weight of component (a3). The gel precursor (A) more preferably comprises from 40 to 70% by weight of component (a1), from 28 to 57% by weight of component (a2) and from 1 to 3% by weight of component (a3).

The mixture provided in step (a) may also comprise typical assistants known to those skilled in the art as further constituents (B). Examples include surface-active substances, flame retardants, nucleating agents, oxidation stabilizers, lubricating and demolding aids, dyes and pigments, stabilizers, for example against hydrolysis, light, heat or discoloration, inorganic and/or organic fillers, reinforcing agents and biocides.

Further details of the assistants and additives mentioned above can be taken from the technical literature, for example from Plastics Additive Handbook, 5th edition, H. Zweifel, ed, Hanser Publishers, Munich, 2001.

The mixture can be provided in step (a) of the process according to the invention in a typical manner. For this purpose, a stirrer or another mixing apparatus is preferably used to achieve good mixing. The other mixing conditions are generally uncritical; for example, it is possible to mix at from 0 to 100° C. and from 0.1 to 10 bar (absolute), especially, for example, at room temperature and atmospheric pressure.

The mixture provided in step (a) can also be referred to as a sol. A sol shall be understood to mean either a colloidal solution in which the organic gel precursor (A) is dispersed ultrafinely in a solvent as a dispersion medium, or a true solution of the organic gel precursor (A) in a solvent.

Step (b)

According to the invention, in step (b), the components (a1) to (a3) are converted to a gel in the presence of the solvent (C). In step (b) of the process according to the invention, the organic gel precursor (A) is thus converted to a gel in a gelation reaction. The gelation reaction is a polyaddition reaction, especially a polyaddition of isocyanate groups and amino groups.

A gel shall be understood to mean a crosslinked system based on a polymer which is present in contact with a liquid (so-called solvogel or lyogel, or with water as a liquid: aquagel or hydrogel). In this case, the polymer phase forms a continuous three-dimensional network.

In step (b) of the process according to the invention, the gel forms typically by being left to stand, for example by simply leaving the vessel, reaction vessel or reactor in which the mixture is present to stand (referred to hereinafter as gelation apparatus). During the gelation (gel formation), the mixture is preferably not stirred or mixed because this might hinder the formation of the gel. It has been found to be advantageous to cover the mixture during the gelation or to close the gelation apparatus.

The duration of the gelation varies according to the type and amount of components used and the temperature and may be several days. It is typically from 1 minute to 10 days, preferably less than 1 day, especially from 5 minutes to 12 hours, more preferably at most 1 hour, especially from 5 minutes to 1 hour.

The gelation can be performed without supplying heat at a temperature in the region of room temperature, especially from 15 to 25° C., or at a temperature elevated relative to room temperature which is 20° C. or more, especially from 25° C. to 80° C. Typically, a higher gelation temperature shortens the duration of gelation. However, a higher gelation temperature is not advantageous in all cases, since an elevated gelation temperature can lead to gels with inadequate mechanical properties. Preference is given to performing the gelation at a temperature in the region of room temperature, especially from 15° C. to 25° C.

The pressure in the course of gelation can vary within a wide range and is generally not critical. It may, for example, be from 0.1 bar to 10 bar, preferably from 0.5 bar to 8 bar and especially from 0.9 to 5 bar (in each case absolute). In particular, it is possible to allow aqueous mixtures to gel at room temperature and atmospheric pressure.

During the gelation, the mixture solidifies to a more or less dimensionally stable gel. Gel formation can therefore be recognized in a simple manner by the contents of the gelation apparatus no longer moving when the gelation apparatus or a vessel with which a sample has been taken is tilted slowly. Moreover, the acoustic properties of the mixture change in the course of gelation: when the outer wall of the gelation apparatus is tapped, the gelled mixture gives a different ringing sound from the as yet ungelled mixture (so-called ringing gel).

In a preferred embodiment, the gel obtained in the gelation in step (b), before step (c) is performed, is subjected to a so-called aging in which the formation of the gel is completed. The aging is effected especially by exposing the gel to a higher temperature than in the preceding gelation for a certain time. To this end, for example, a heating bath or a heating cabinet can be used, or the apparatus or environment in which the gel is present can be heated in a suitable manner.

The temperature in the course of aging can vary within a wide range and is not critical per se. In general, aging is effected at temperatures of from 30° C. to 150° C., preferably from 40° C. to 100° C. The aging temperature should be in the range from 10° C. to 100° C., especially from 20° C. to 80° C., above the gelation temperature. When gelation has been effected at room temperature, it is possible to effect aging especially at temperatures of from 40° C. to 80° C., preferably at about 60° C. The pressure in the course of aging is uncritical and is typically from 0.9 to 5 bar (absolute).

The duration of the aging depends on the type of the gel and may be a few minutes, but may also take a long time. The duration of the aging may, for example, be up to 30 days. Typically, the duration of the aging is from 10 minutes to 12 hours, preferably from 20 minutes to 6 hours and more preferably from 30 minutes to 5 hours.

According to the type and composition, the gel may shrink slightly during the aging and become detached from the wall of the gelation apparatus. Advantageously, the gel is covered during the aging, or the gelation apparatus in which the gel is present is closed.

Step (c)

According to the invention, in step (c), the gel obtained in the previous step is dried, preferably by converting the liquid present in the gel to the gaseous state at a temperature and a pressure below the critical temperature and the critical pressure of the liquid present in the gel to obtain a xerogel. Drying is understood to mean the removal of the fluid phase of the gel.

As an alternative, it is likewise possible to dry the gel under supercritical conditions to obtain an aerogel, especially by exchange of the solvent for a suitable fluid phase, especially carbon dioxide, which is subsequently removed under supercritical conditions.

Preference is given to drying the resulting gel by converting the solvent (C) to the gaseous state at a temperature and a pressure below the critical temperature and the critical pressure of the solvent (C). Accordingly, preference is given to effecting the drying by removing the solvent (C) which was present in the reaction without preceding exchange for a further solvent.

Consequently, after step (b), the gel is preferably not contacted with an organic liquid in order to exchange the solvent (C) present in the gel, especially in the pores of the gel, for this organic liquid. This is true irrespective of whether the gel is aged or not. When a solvent exchange is omitted, the process can be performed in a particularly simple and inexpensive manner. When, however, a solvent exchange is performed, it is preferred to exchange the solvent (C) for a nonpolar solvent, especially for hydrocarbons such as pentane.

For the drying by conversion of the liquid present in the gel, preferably the solvent (C), to the gaseous state, useful methods are in principle both vaporization and evaporation, but not sublimation. Drying by vaporization or evaporation includes especially drying under atmospheric pressure, drying under reduced pressure, drying at room temperature and drying at elevated temperature, but not freeze-drying. According to the invention, drying is effected at a pressure and a temperature which are below the critical pressure and below the critical temperature of the liquid present in the gel. In step (d) of the process according to the invention, the solvent-containing gel is thus dried to form the organic porous gel as the process product.

To dry the gel, the gelation apparatus is typically opened and the gel is kept under the stated pressure and temperature conditions until the liquid phase has been removed by conversion to the gaseous state, i.e. the liquid phase is vaporized or evaporated. In order to accelerate the vaporization, it is frequently advantageous to remove the gel from the vessel. In this way, the gel/ambient air phase interface over which the vaporization and/or evaporation takes place is enlarged. For example, the gel can be placed onto a flat underlay or a sieve for drying. Useful drying processes are also the drying processes familiar to those skilled in the art, such as convection drying, microwave drying, vacuum drying cabinets or combinations of these processes.

The gel can be dried under air or, if it is oxygen-sensitive, also under other gases such as nitrogen or noble gases, and it is possible for this purpose optionally to use a drying cabinet or other suitable apparatus in which the pressure, the temperature and the solvent content of the environment can be controlled.

The temperature and pressure conditions to be selected in the course of drying depend upon factors including the nature of the liquid present in the gel. Drying is preferably effected at a pressure which is below the critical pressure $p_{crit}$ of the liquid present in the gel, preferably the solvent (C), and at a temperature which is below the critical temperature $T_{crit}$. Accordingly, drying is effected under subcritical conditions. In this context, critical means: at the critical pressure and the critical temperature, the density of the liquid phase is equal to the density of the gas phase (so-called critical density), and, at temperatures above $T_{crit}$, the fluid phase can no longer be liquefied even in the case of application of ultra high pressures.

When acetone is used as the solvent, drying is effected at temperatures of from 0° C. to 150° C., preferably from 10° C. to 100° C. and more preferably from 15° to 80° C., and at pressures from high vacuum, for example from $10^{-3}$ mbar, to 5 bar, preferably from 1 mbar to 3 bar and especially from 10 mbar to about 1 bar (absolute). For example, drying can be effected at atmospheric pressure and from 0° C. to 80° C., especially at room temperature. Particular preference is given to drying the gel in step (d) at a pressure of from 0.5 to 2 bar (absolute) and at a temperature of from 0 to 100° C.

Other liquids present in the gel, especially solvents (C) other than acetone, require adjustments to the drying conditions (pressure, temperature, time) which can be determined by the person skilled in the art by simple tests.

The drying can be accelerated or completed by applying a vacuum. In order to further improve the drying action, this vacuum drying can be undertaken at a higher temperature than the drying at customary pressure. For example, the majority of the solvent (C) can first be removed at room temperature and atmospheric pressure within from 30 min to 3 hours, and then the gel can be dried at from 40 to 80° C. under a reduced pressure of from 1 to 100 mbar, especially from 5 to 30 mbar, within from 10 min to 6 hours. It will be appreciated that longer drying times are also possible, for example from 1 to 5 days. However, preference is frequently given to drying times of below 12 hours.

Instead of such a stepwise drying, the pressure can also be lowered continuously, for example in a linear or exponential manner, during the drying, or the temperature can be increased in such a manner, i.e. according to a pressure or temperature program. By its nature, the lower the moisture content of the air, the more rapidly the gel dries.

The same applies mutatis mutandis to liquid phases other than water and to gases other than air.

The preferred drying conditions depend not only on the solvent but also on the nature of the gel, especially the stability of the network in relation to the capillary forces acting in the course of drying.

In the course of drying in step (d), the fluid phase is generally removed completely or down to a residual content of from 0.01 to 1% by weight based on the resulting porous gel.

Properties of the Porous Gels and Use

The porous gels obtainable by the process according to the invention preferably have a volume-averaged mean pore diameter of at most 5 µm. The volume-averaged mean pore diameter of the xerogels obtainable by the process according to the invention is preferably from 200 nm to 5 µm.

The particularly preferred volume-weighted mean pore diameter of the porous gels obtainable by the process according to the invention is at most 5 µm, especially at most 3.5 µm, most preferably at most 2.5 µm.

In general, the volume-weighted mean pore diameter is at least 10 nm, preferably at least 50 nm. In many cases, the volume-weighted mean pore diameter is at least 100 nm, especially at least 200 nm. The porous gels obtainable by the process according to the invention preferably have a porosity of at least 70% by volume, especially from 70 to 99% by volume, more preferably at least 80% by volume, most preferably at least 85% by volume, especially from 85 to 95% by volume.

The density of the porous gels obtainable by the process according to the invention is typically from 20 to 600 g/l, preferably from 50 to 500 g/l and more preferably from 100 to 400 g/l.

The process according to the invention gives rise to a coherent porous material and not just a polymer powder or polymer particles. The three-dimensional shape of the resulting porous gel is determined by the shape of the gel, which is determined in turn by the shape of the gelation apparatus. For example, a cylindrical gelation vessel typically gives rise to an approximately cylindrical gel which can then be dried to a porous gel in cylinder form.

The inventive porous gels and the porous gels obtainable by the process according to the invention have a low thermal conductivity, a high porosity and a low density with a simultaneously high mechanical stability. In addition, the porous gels have a low mean pore size. The combination of the aforementioned properties allows use as an insulating material in the field of thermal insulation, especially for applications in the vacuum sector where a minimum thickness of vacuum panels is preferred, for example in cool units or in buildings. For instance, use in vacuum insulation panels, especially as a core material for vacuum insulation panels, is preferred. Preference is also given to the use of the inventive porous gels as an insulating material.

Furthermore, the low thermal conductivity of the inventive porous gels enables applications at pressures of from 1 to 100 mbar and especially from 10 mbar to 100 mbar. The property profile of the inventive porous gels opens up especially applications in which a long lifetime of the vacuum panels is desired and which have a low thermal conductivity even in the case of a pressure increase of about 2 mbar per year even after many years, for example at a pressure of 100 mbar. The inventive porous gels and the porous gels obtainable by the process according to the invention have favorable thermal properties on the one hand, and favorable material properties such as simple processability and high mechanical stability, for example low brittleness, on the other hand.

EXAMPLES

The pore volume in ml per g of sample and the mean pore size of the materials were determined by means of mercury porosimetry to DIN 66133 (1993) at room temperature. In the context of this invention, the mean pore size can be equated to the mean pore diameter. The volume-weighted mean pore diameter is determined by calculation from the pore size distribution determined according to the abovementioned standard.

The porosity in the unit % by volume was determined by the formula $P=(V_i/(V_i+V_s))*100\%$ by Volume, where P is the Porosity, $V_i$ is the Hg Intrusion Volume to DIN 66133 in ml/g and $V_s$ is the specific volume in ml/g of the specimen.

The density $\rho$ of the porous gels in the unit g/ml was calculated by the formula $\rho=1/(V_i+V_s)$. The specific volume used was the value $1/V_s=1.38$ g/ml, which was determined by He pycnometry.

The thermal conductivity $\lambda$ was determined by means of the dynamic hot wire method. In the hot wire method, a thin wire is embedded in the sample to be analyzed, which serves simultaneously as the heating element and temperature sensor. The wire material used was a platinum wire with a diameter of 100 micrometers and a length of 40 mm, which was embedded between two halves of the particular specimen. The test setup composed of sample and hot wire was prepared in an evacuable recipient in which, after the evacuation, the desired pressure was established by admitting gaseous nitrogen.

During the experiment, the wire was heated at constant power. The temperature was 25° C. The evolution with time of the resulting temperature rise at the site of the hot wire was recorded by measuring the resistance. The thermal conductivity was determined by fitting an analytical solution to the evolution of temperature with time, taking account of a thermal contact resistance between sample and wire, and axial heat losses, according to H.-P. Ebert et al., High Temp.-High. Press, 1993, 25, 391-401. The gas pressure was determined with two capacitative pressure sensors with different measurement ranges (0.1 to 1000 mbar and 0.001 to 10 mbar).

The following compounds were used:

a-1: oligomeric MDI (Lupranat® M50) with an NCO content of 31.5 g per 100 g to ASTM D-5155-96 A, a functionality in the range from 2.8 to 2.9 and a viscosity of 550 mPa·s at 25° C. to DIN 53018.

a-2: oligomeric diaminodiphenylmethane with a viscosity of 2710 mPa·s at 50° C. to DIN 53018, a functionality in the region of 2.4 and a potentiometrically determined amine number of about 560 mg KOH/g.

a-3: polyethylenimine with a water content of less than 1% by weight, a viscosity at 20° C. of 200,000 mPa*s, a charge density at pH 4.5 of 17 meq/g, based on 100% by weight of a-3, a ratio of prim/sec/tert amino groups of 1/1.2/0.76 and molecular weight (Mw) of 25,000 g/mol.

a-4: oligomeric MDI (Lupranat® M200) with an NCO content of 30.9 g per 100 g to ASTM D-5155-96 A, a functionality in the region of three and a viscosity of 2100 mPa·s at 25° C. to DIN 53018.

Example 1

2.4 g of compound a-1 were dissolved in 10.5 g of acetone in a beaker with stirring at 20° C. 1.3 g of compound a-2 and 0.1 g of compound a-3 were dissolved in 11 g of acetone in a second beaker. The two solutions from step (a) were mixed. A clear low-viscosity mixture was obtained. The mixture was left to stand at room temperature for 24 hours for curing. Subsequently, the gel was removed from the beaker and the liquid (acetone) was removed by drying at 20° C. for 7 days.

The resulting material had a porosity of 87% by volume with a corresponding density of 170 g/l.

Example 1C 2.4 g of compound a-1 were dissolved in 10.5 g of acetone in a beaker with stirring at 20° C. 1.3 g of compound a-2 were dissolved in 11 g of acetone in a second beaker. The two solutions from step (a) were mixed. A clear low-viscosity mixture was obtained. The mixture was left to stand at room temperature for 24 hours for curing. Subsequently, the gel was removed from the beaker and the liquid (acetone) was removed by drying at 20° C. for 7 days.

Compared to example 1, the resulting material had a significantly shrunken form. The porosity was 71% by volume with a corresponding density of 390 V.

Example 2

40 g of compound a-4 were dissolved in 212 g of acetone in a beaker with stirring at 20° C. 25 g of compound a-2 and 0.4 g of compound a-3 were dissolved in 216.8 g of acetone in a second beaker. The two solutions from step (a) were mixed. An immediate reaction took place. The mixture was left to stand at room temperature for 24 hours for curing. Subsequently, the gel was removed from the beaker and the liquid (acetone) was removed by drying at 20° C. for 7 days.

The resulting material had a porosity of 87% by volume with a corresponding density of 170 g/l.

The resulting material had a thermal conductivity of 35 mW/m*K at a pressure of 1013 mbar and 4.6 mW/m*K at a pressure of 0.037 mbar.

Example 3

2.4 g of compound a-1 were dissolved in 10.5 g of acetone in a beaker with stirring at 20° C. 1.3 g of compound a-2 and 0.1 g of triethylenediamine were dissolved in 11 g of acetone in a second beaker. The two solutions from step (a) were mixed. An immediate reaction took place. The mixture was left to stand at room temperature for 24 hours for curing. Subsequently, the gel was removed from the beaker and the liquid (acetone) was removed by drying at 20° C. for 7 days.

Compared to example 1, the resulting material had a significantly shrunken form. The porosity was 74% by volume with a corresponding density of 350 g/l.

The invention claimed is:

1. A porous gel comprising, in reacted form:
   (a1) 30 to 90% by weight of a polyfunctional isocyanate,
   (a2) 9.99 to 66% by weight of at least one polyfunctional aromatic amine selected from the group consisting of 4,4'-diaminodiphenylmethane, 2,4'-diaminodiphenylmethane, 2,2'-diaminodiphenylmethane and oligomeric diaminodiphenylmethane, and
   (a3) 0.01 to 4% by weight of a polyalkylenepolyamine, based on the total weight of (a1), (a2) and (a3),
   wherein the polyalkylenepolyamine is an aliphatic amine which comprises at least three reactive amino groups.

2. The porous gel of claim 1, comprising, in reacted form:
   (a1) 38 to 80% by weight of a polyfunctional isocyanate,
   (a2) 19 to 58% by weight of at least one polyfunctional aromatic amine selected from the group consisting of 4,4'-diaminodiphenylmethane, 2,4'-diaminodiphenylmethane, 2,2'-diaminodiphenylmethane and oligomeric diaminodiphenylmethane, and
   (a3) 0.01 to 4% 1 to 4% by weight of a polyalkylenepolyamine,
   based on the total weight of (a1), (a2) and (a3).

3. The porous gel of claim 1, wherein the polyalkylenepolyamine (a3) is highly branched.

4. The porous gel of claim 1, wherein the gel is a xerogel.

5. The porous gel of claim 1, wherein the polyalklenepolyamine (a3) is a polyethyleneimine.

6. The porous gel of claim 1, wherein the at least one polyfunctional aromatic amine (a2) comprises oligomeric diaminodiphenylmethane and has a functionality of at least 2.3.

7. The porous gel of claim 1, wherein the polyfunctional isocyanate (a1) is at least one selected from the group consisting of diphenylmethane 4,4'-diisocyanate, diphenylmethane 2,4'-diisocyanate, diphenylmethane 2,2'-diisocyanate and oligomeric diphenylmethane diisocyanate.

8. The porous gel of claim 1, wherein the polyfunctional isocyanate (a1) comprises oligomeric diphenylmethane diisocyanate and has a functionality of at least 2.5.

9. The porous gel of claim 1, wherein the polyfunctional isocyanate (a1) comprises oligomeric diphenylmethane diisocyanate, the at least one polyfunctional aromatic amine (a2) comprises oligomeric diaminodiphenylmethane, and a sum of a functionality of (a1) and of a functionality of (a2) is at least 5.5.

10. The porous gel of claim 1, wherein a volume-weighted mean pore diameter is at most 3 μm.

11. A process for preparing the porous gel of claim 1, the process comprising
   (a) mixing the polyfunctional isocyanate (a1) with a solvent to obtain a first mixture, mixing the at least one polyfunctional aromatic amine (a2) with a solvent to obtain a second mixture, and mixing the polyalkylenepolyamine (a3) with a solvent to obtain a third mixture;
   (b) converting the first, second, and third mixtures in the presence of the solvent to a gel; and
   (c) drying the gel.

12. The process of claim 11, wherein the drying (c) is performed by converting the solvent to a gaseous state at a temperature and a pressure below a critical temperature and a critical pressure of the solvent.

13. A porous gel obtained by the process of claim 11.

14. An insulating material comprising the gel of claim 1.

15. A vacuum insulation panel comprising the gel of claim 1.

16. A porous gel obtained by the process of claim 12.

17. The porous gel of claim 1 comprising, in reacted form:
   (a1) 40 to 70% by weight of a polyfunctional isocyanate,
   (a2) 29 to 57% by weight of at least one polyfunctional aromatic amine selected from the group consisting of 4,4'-diaminodiphenylmethane, 2,4'-diaminodiphenylmethane, 2,2'-diaminodiphenylmethane and oligomeric diaminodiphenylmethane, and
   (a3) 1 to 3% by weight of a polyalkylenepolyamine, based on the total weight of (a1), (a2) and (a3).

18. The porous gel of claim 1, having a volume-weighted mean pore diameter of 200 nm to 2.5 μm.

19. The porous gel of claim 1, comprising an oligomeric diphenylmethane diisocyanate as (a1) the polyfunctional isocyanate, oligomeric diaminodiphenylmethane as (a2) the at least one polyfunctional aromatic amine, and polyethyleneimine as (a3) the polyalkylenepolyamine.

20. The porous gel of claim 19, wherein the oligomeric diphenylmethane diisocyanate has an NCO content of 31.5 g per 100 g according to ASTM D-5155-96 A, a functionality in the range from 2.8 to 2.9 and a viscosity of 550 mPa·s at 25° C. according to DIN 53018.

21. The porous gel of claim 19, wherein the oligomeric diphenylmethane diisocyanate has an NCO content of 30.9 g per 100 g according to ASTM D-5155-96 A, a functionality of about three and a viscosity of 2100 mPa·s at 25° C. according to DIN 53018.

22. The porous gel of claim 1, wherein said polyalkylenepolyamine has a weight-average molecular weight (Mw) ranging from 500 g/mol to 3,000,000 g/mol.

* * * * *